United States Patent [19]

Landler

[11] Patent Number: 4,968,555
[45] Date of Patent: Nov. 6, 1990

[54] COMPOSITE MATERIAL AND PROCESS FOR THE PRODUCTION THEREOF

[76] Inventor: Yvan Landler, 12, Boulevard Desgranges, 92330 Sceaux, France

[21] Appl. No.: 234,811

[22] Filed: Aug. 22, 1988

[30] Foreign Application Priority Data

Sep. 18, 1987 [FR] France .................. 87 13012

[51] Int. Cl.$^5$ .................................. B32B 7/00
[52] U.S. Cl. .................... 428/245; 156/166; 156/180; 156/181; 156/296; 428/253; 428/254; 428/280; 428/284; 428/290; 428/244; 428/295; 428/413
[58] Field of Search ............... 156/166, 180, 181, 296; 428/245, 253, 254, 292, 295, 280, 413, 294, 284

[56] References Cited

U.S. PATENT DOCUMENTS

| | | | |
|---|---|---|---|
| 4,285,749 | 8/1981 | Stiles | 156/180 |
| 4,680,224 | 7/1987 | O'Connor | 428/294 |
| 4,818,318 | 4/1989 | McMahn et al. | 156/166 |
| 4,873,128 | 10/1989 | Ma et al. | 156/180 |
| 4,892,774 | 1/1990 | Vallance | 156/306.6 |
| 4,900,499 | 2/1990 | Mills | 156/180 |

Primary Examiner—James J. Bell
Attorney, Agent, or Firm—Nils H. Ljungman & Associates

[57] ABSTRACT

A composite material, and a process for making the same, comprises a matrix of a semi-crystalline polyolefin homopolymer or copolymer of any molecular weight, and a reinforcement material comprising textile and/or metal materials coated with a layer for permitting adhesion between the reinforcement material and the matrix. The layer comprises at least one elastomer component and is intimately bonded to the polyolefin matrix by means of a relatively thin coating. The coating on the adherized reinforcement material includes a polyolefin with an average molecular weight of at least 500,000.

26 Claims, 2 Drawing Sheets

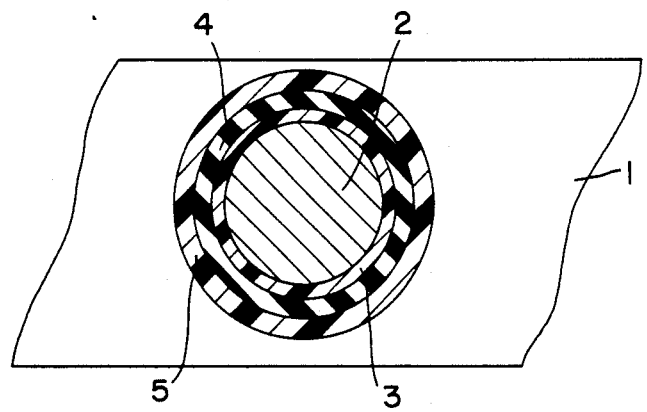
FIG_1
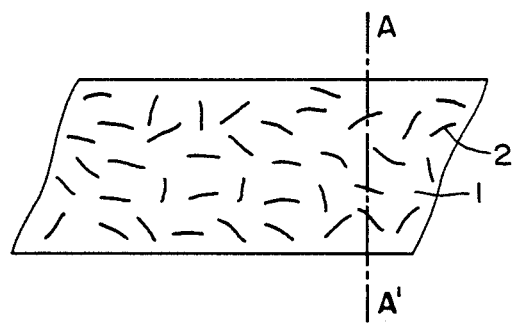
FIG_2
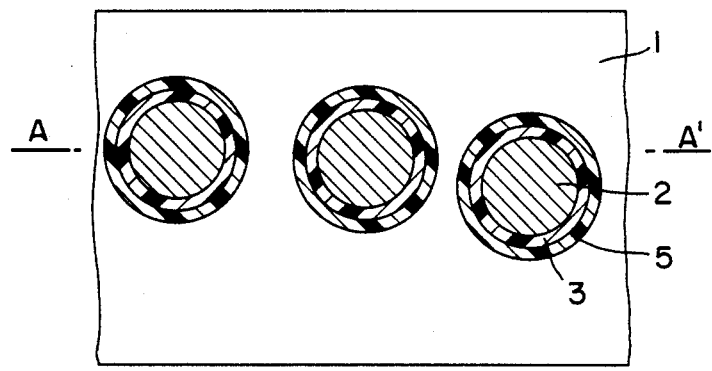
FIG_3

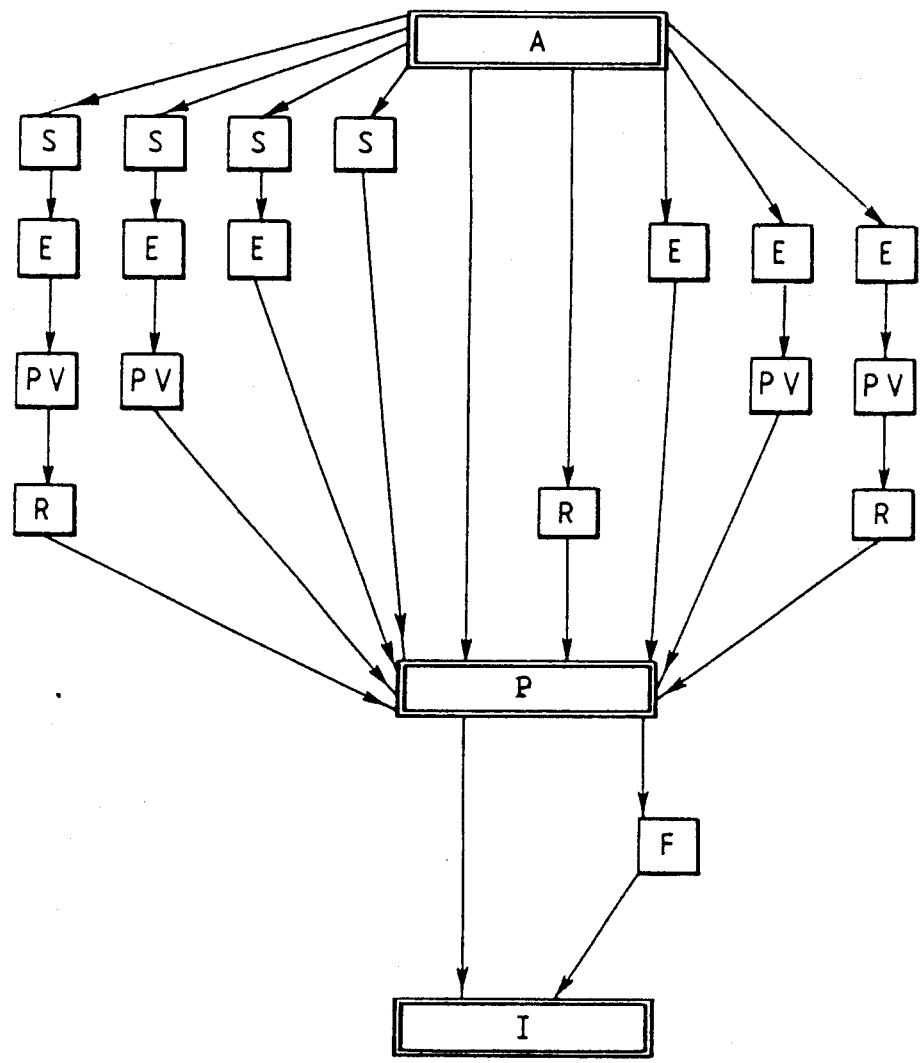
FIG_4

COMPOSITE MATERIAL AND PROCESS FOR THE PRODUCTION THEREOF

BACKGROUND OF THE INVENTION

1. Field of the Invention:

This invention relates to the field of composite materials which are currently used in a very large number of industrial applications, i.e. in the field of materials comprising a polymer matrix including a reinforcement element.

The invention relates in particular to polyolefin matrix composites.

2. Description of the Prior Art:

In recent years, composite materials have undergone considerable development in all industrial fields, because the polymer matrices have—in addition to the ability to assume complex shapes—beneficial characteristics at a moderate cost, if their mechanical properties can be improved by the incorporation of a reinforcement material, either in the form of a mineral or organic additive (such as carbon black in elastomer matrices) or in the form of a—continuous or discontinuous —reinforcement comprising textile or metal threads or wires, or in the form of elastomer matrices (e.g. hoses or belts or tires), or thermosetting matrices (e.g. automobile suspension springs with an epoxy matrix, or high-technology composites for aerospace applications).

It is almost impossible—given the abundance of publications on the subject—to prepare a list of the prior art for elastomer matrix or thermosetting composites.

On the other hand, there are practically no references relative to polyolefin matrix composites, which is explained by the chemical nature of these materials, such as polyethylene, polypropylene or their semi-crystalline copolymers, which gives them high chemical inertness and, consequently, an absence of affinity for other materials, making adhesion substantially impossible between the polyolefin matrices and reinforcements other than polyolefins themselves (as illustrated in U.S. Pat. No. 4,501,856 of the Allied Corporation), without a chemical modification treatment—which is often very complex to perform—of the polyolefins, as described, for example, in U.S. Pat. No. 3,936,415 of Owens Corning Fiberglass Corporation, which uses an oxidized polyolefin.

OBJECTS OF THE INVENTION

An objective of the invention is therefore to solve the affinity problems between polyolefins—which are thereby rendered capable of constituting matrices—and the reinforcement elements, to realize composites which are economically very competitive, on account of the low cost of the polyolefins materials which are cheap and widely available. To do this, it is apparent that simple solutions which do not require a complex and expensive chemical transformation of the polymer must be sought.

A further object of the invention includes therefore a polyolefin matrix composite comprising a reinforcing element intimately bonded to said matrix.

Another object of the invention is the process and its variants which make it possible to obtain such a composite, by simple and economical means.

SUMMARY OF THE INVENTION

The composite, which is the object of the invention, is characterized by up to all of the following elements:

a: It comprises a polyolefin matrix, i.e. one comprising a polyolefin homopolymer such as polyethylene, of high or low density, being linear or branched; polypropylene or the higher homologues of polyolefins: or their semi-crystalline copolymers;

b: The matrix defined above may be reinforced by: a continuous element (i.e. one which comprises long fibers in the form of cables or threads, knitted or woven); or discontinuous elements (i.e. one which comprises short fibers, the length of which is not more than several tens of millimeters, or felt, or nonwoven fabric). The reinforcement elements may be realized by the use of metal wires or mineral or organic textiles, which can be natural, artificial or synthetic. In the remainder of this document, these elements will be designated as being "reinforcement" elements or "reinforcement";

c: The polyolefin matrix and the reinforcement are bonded without—without chemical modification of the polyolefin—by an intimate bond provided by at least one layer of adhesive, which has a low thickness in relation to the dimensions of the reinforcement, comprising an elastomer component, and another layer, also of low thickness, of polyolefin with a very high molecular weight. This polyolefin layer is constituted, preferably, of polyethylene or polypropylene with an average molecular weight equal to at least 500,000.

The process for the realization of the composite, which is the object of the invention, is characterized by the fact that it includes at least the following operations:

a. Coating of the reinforcement with a layer which promotes adhesion between the reinforcement and the matrix. This adhesion layer will be termed an adhesion or adherization layer herein. This adhesion layer preferably comprises an elastomer component. The coating may be followed by a heat treatment which is intended, as a function of the composition, for the polymerization, polycondensation or vulcanization—at least partial—of the adherization layer. This operation achieves what will be defined, in the following portion of the explanation, as the reinforcement treated to make it adhere or the "adherized reinforcement"; this treatment to promote adhesion will be termed a so-called "adherization treatment" which can be performed, for example, by passage of the reinforcement through a solution of epoxy resin, a ternary aqueous suspension of resorcinol, formol and an elastomer latex or phenol-formol and latex, a solution in an appropriate solvent of an elastomer compound with a formulation adapted to promote adhesion to the reinforcement; other techniques for the realization of the adherization treatment comprise a coating, by extrusion of the adherization layer on the reinforcement, by some other type of surface coating of the reinforcement including possible immersion thereof, or by deposition of a thin film of elastomer compound on the reinforcement, during fabrication, e.g. on a mandrel or in a mold:

b. The coating of the reinforcement adherized (treated to promote adhering) by a thin layer of polyolefin with a high molecular weight (at least 500,000) is done e.g. by passage of the adherized reinforcement in a solution of the polyolefin fin in an appropriate solvent or in a fluidized bed comprising a suspension of the polyolefin in a gaseous flux, preferably air or nitrogen; this operation produces an "adherized reinforcement treated to promote adhering which in turn is coated with polyolefin";

c. The incorporation of the adherized reinforcement coated with polyolefin, in the form of continuous or discontinuous elements, in the polyolefin matrix, consisting of polyethylene, polypropylene, higher homologues of polyolefins or their semi-crystalline copolymers; this operation is realized by the conventional means used in the polymer transformation industry, e.g. by intimate mixing of the adherized reinforcement coated with polyolefin with the polyolefin matrix, in a cylinder mixer or an internal mixer, for a discontinuous reinforcement, or by filamentary winding, first of the adherized reinforcement coated with polyolefin, then of a sheet of polyolefin on a mandrel for the realization of the continuous reinforcement composite: this operation results in the semi-finished composite, which will be transformed into a finished product by a molding operation conventionally used in the polymer transformation industry, and will make possible an intimate bonding between the high molecular weight polyolefin which constitutes the coating of the adherized reinforcement and the polyolefin of any molecular weight which constitutes the matrix.

Other additional treatments can be applied, for example, to improve the adherence of the reinforcement when adhering to the polyolefin matrix. By way of non-limiting examples, such treatments include the coating of the adherized reinforcement by a thin layer of elastomer compound which may be partly vulcanized by an appropriate heat treatment, the roughening of the surface of the adherized reinforcement, or by a heat treatment of the polyolefin coating of the adherized reinforcement.

BRIEF DESCRIPTION OF THE DRAWINGS

The details and variants of the invention are explained in greater detail below, with reference to the accompanying drawings and examples, in which:

FIG. 1 shows a schematic cross section at the level of the reinforcement of a typical continuous reinforcement composite.

FIG. 2 shows a schematic longitudinal section at the level of the reinforcement of a typical discontinuous reinforcement composite.

FIG. 3 shows an enlarged cross section of FIG. 2, in Zone AA' representing three discontinuous reinforcement elements.

FIG. 4 is a schematic diagram of all the treatments—some of which may be optional or unnecessary, depending on the type and shape of the reinforcement—which constitute the procedure for the realization of the composite and its variants, by combination of all or some of the elementary operations.

DESCRIPTION OF THE PREFERRED EMBODIMENTS

FIG. 1 shows, schematically, in cross section at the level of the reinforcement, the constitution of a typical continuous reinforcement composite, comprising textile (including glass) or metal wires, fibers or cables, either in linear form, or in the form of knitted or woven structures, for example. Whatever the shape of the reinforcement, the section is made at the level of an elementary fiber embedded in a polyolefin matrix 1, the fiber 2 being coated with a layer 3, which is thin in relation to the diameter of the fiber, of an adherization compound which can be constituted of an epoxy resin, a ternary polycondensate of resorcinol, formol and elastomer latex or a formophenol compound and latex, and then with a second thin layer 4 of an elastomer compound of a formulation suitable on the one hand for adhesion to the adherization compound, and on the other hand for the successive heat treatments necessary to obtain the composite. Thus, for example, the elastomer coating compound of the fiber will advantageously include vulcanization-retarding additives to allow it to undergo, without complete reticulation, the heat treatment which makes it adhere to the reinforcement. Above the elastomer compound 4 coating the reinforcement 2 there is a thin coating 5 comprising high molecular weight polyolefin such as, preferably, polyethylene or polypropylene.

FIG. 2 shows, schematically, in longitudinal section at the level of the reinforcement, the constitution of a representative discontinuous reinforcement composite. The reinforcement can comprise elements 2 made of textile (including glass) or metal wires, fibers or cables, with a length generally less than 20 millimeters, and dispersed in the polyolefin matrix 1.

FIG. 3 is an enlarged cross section of FIG. 2, in Zone AA'. The section is made at the level of three elements embedded in the polyolefin matrix 1, the reinforcement elements 2 being coated with a layer 3, which is thin in relation to the diameter of each fiber, of an adherization compound, based on a ternary polycondensate of resorcinol, formol and elastomer latex.

As described above, the continuous reinforcement can be present in the form of single wires assembled or composed, or threads, or cables, or of assemblies such as knitted or woven fabrics of different textures.

The discontinuous reinforcement comprises relatively short elements (no more than several tens of millimeters), free in the form of short dispersable fibers, or assembled in the form of felt or non-woven fabric.

The reinforcement can comprise natural fibers such as silk or cotton, artificial fibers such as rayon or spun rayon, synthetic fibers such as polyamide, polyester, aramid, polyvinyl alcohol, polyacrylonitrile, or carbon fiber.

The reinforcement can be of a mineral nature, such as glass, or of an organic nature such as one of the synthetic fibers cited above. It can also comprise brass-plated or zinc-plated steel cables, which are very long or in the form of fabrics, or in the form of short fibers.

The adherization treatments are realized on the basis of dispersions or solutions, in organic solvents, mineral solvents or in water, of resins such as epoxies, ternary formophenol compounds or resorcinol-formol compounds including an elastomer latex, or on the basis of solutions of elastomer compounds or from elastomer compound base mixtures.

The polyolefin with a high molecular weight intended for coating of the adherized reinforcement, preferably comprises ethylene or propylene homopolymers, with an average molecular weight of at least 500,000, although the use of semi-crystalline ethylene and propylene polymers can also be considered, as long as they have a molecular weight at least equal to 500,000.

Finally, the matrix generally includes high-density or low-density, linear or branched polyethylene, polypropylene, the higher homologues of polyolefins, or one of their semi-crystalline copolymers.

Generally speaking, the process and the variants which make it possible to obtain composites in accordance with the invention are defined by a combination of all or some of the elementary operations indicated schematically in FIG. 4.

No distinction is made, at the level of the processes, between a continuous or discontinuous reinforcement, and the optional cutting of the fiber necessary to obtain a discontinuous reinforcement with short fibers can be made at any stage of the treatment before the incorporation in the polyolefin matrix. The discontinuous reinforcements in the form of felt or non-woven fabric are treated as continuous reinforcements, at the level of the processes.

The different elementary operations, the total or partial combination of which defines the process for the realization of a given composite, are summarized below:

The adherization treatment will be designated by (A). It is conducted preferably by impregnation of the reinforcement by passage through an adherization compound defined above or by the coating of the reinforcement by the elastomer compound, either in a cylinder mixer, or by extrusion of a coating on the reinforcement if it is a question of threads or cables or knitted cloths or ribbon such as a narrow woven material, or by some other type of surface coating including possible immersion or continuous coating for reinforcements which are wider.

The adherization treatment (A) can be followed, but need not be, by a drying treatment (S), which allows the evaporation of the solvent from the adherization compound and/or the polymerization, polycondensation or vulcanization—partial or total—of the adherization compound, depending on its type.

Optionally, the adherization treatment (A), which can but need not be followed by the drying (S), can be supplemented by a coating operation (E) of the adherized fiber by an elastomer compound with a suitable formulation, intended to reinforce the adherence between the constituent elements of the composite.

This operation can be conducted using different techniques:
it is possible, for example, to impregnate the adherized reinforcement by passage through an elastomer compound, which is currently done for continuous reinforcements;
it is possible to proceed with a coating of the threads, the cables or the knitted fabrics by extrusion of the elastomer compounds;
the knitted, woven, felt and non-woven fabrics are generally coated with an elastomer compound using some other type of surface coating process including possible immersion or continuous coating thereof;
another method, which is particularly suited to reinforcements used in the form of filamentary windings or ready-made sheets, consists of simply depositing a layer of the elastomer compound below and above the reinforcement.

If the coating (E) is applied, it can—advantageously but not obligatorily—be followed by a pre-vulcanization (PV) of the elastomer compound, designed to improve the adherence between the adherized reinforcement and the elastomer compound. The conditions of said pre-vulcanization heat treatment must be selected to bring about only a partial vulcanization of the elastomer compound, the formulation of which can be adapted, e.g. by the incorporation of vulcanization retarding agents, to facilitate this operation.

A so-called surface roughening operation (R), can be useful —whether or not the operations of coating with an additional layer of elastomer compound and partial vulcanization have been executed—to facilitate the subsequent coating of the reinforcement adherized by the high molecular weight polyolefin.

This is simply an operation to reactivate the surface of the adherized reinforcement by the action of a solvent applied with a sponge or a brush, which is then allowed to evaporate before the following operation.

The operation—essential in the invention—of coating the adherized reinforcement with a thin layer of high molecular weight polyolefin (P) is generally done by one of the following two techniques:
Treatment of the reinforcement by a solution of the high molecular weight polyolefin in an appropriate solvent, e.g. hot decaline, which will cause a slight swelling of the adherization layer and the deposition—the thickness of which will vary as a function of the speed of the treatment, the concentration of the solution, the drying and other parameters of the treatment—of a thin layer of dissolved polyolefin. It is then sufficient to proceed to the evaporation of the solvent;
The passage of the reinforcement in a fluidized bed comprising a suspension, in a gaseous flux—most generally air or nitrogen to prevent oxidation of the polyolefin—of grains of the high molecular weight polyolefin. It is advantageous to realize this operation at a temperature on the order of 80° to 100° degrees C. to facilitate the adherence of the grains of polyolefin on the adherized reinforcement.
Other methods can also be used, e.g. the extrusion of the polyolefin on the reinforcement, in an extruder. It is known, however, that it is difficult to proceed with the extrusion of high molecular weight polyolefins and that this operation requires particular operating conditions.

A heat treatment (F) will be advantageously applied to the polyolefin coated adherized reinforcement when the coating has been done by the fluidized bed technique. It consists of raising the temperature of the polyolefin-coated adherized reinforcement to a temperature close to the melting temperature of the polyolefin, i.e. around 135 degrees C. for polyethylene and 160 degrees C. for polypropylene, which makes it possible to end the polycondensation, polymerization or vulcanization of the adherization compound, in contact with the high molecular weight polyolefin and to cause adherence between these two components.

The final incorporation (I) of the adherized reinforcement coated with high molecular weight polyolefin in the polyolefin matrix. This operation can be done using numerous techniques, among which the most frequently used are:
extrusion of a sheath of polyolefin matrix on a fiber, a ribbon or a knitted fabric constituting the reinforcement;
the surface coating of the continuous reinforcement by the polyolefin matrix in solution;
the hot calendaring between rolls, of the polyolefin and the continuous or discontinuous reinforcement;

the deposit of a film, a sheet or a plate of polyolefin on the reinforcement deposited in the form of a filamentary winding, followed by a treatment to make the surface tacky and a heat treatment intended to improve the penetration of the reinforcement by the polyolefin matrix or on the reinforcement deposited in the bottom of a mold, or on the reinforcement deposited on a ready-made form: or pultrusion, a technique which has become conventional in the polymer transformation industry.

The fiber which has thus been given an affinity for the polyolefin matrix, and which is then incorporated with it, constitutes the semi-finished composite which can be used in the form of sheets, of which can be granulated so that it can be transformed by molding, extrusion, injection or any other appropriate transformation technique.

An analysis of FIG. 4 shows that, depending on the nature of the reinforcement, the process comprises at least three essential operations—indicated by a double line—namely:

adherization (A) of the reinforcement, by an adherization compound containing an elastomer component;

coating (P) of the adherized reinforcement by a polyolefin with a high molecular weight:

incorporation (I) of the adherized reinforcement coated with a polyolefin with a high molecular weight in the polyolefin matrix.

The different treatments illustrated schematically in FIG. 4 include, from generally the most simple to generally the most complete, the following combinations:

Operations A-P-I, for the most simple treatment,
Operations A-P-F-I,
Operations A-E-P-I
Operations A-S-P-I
Operations A-R-P-I
Operations A-E-P-F-I
Operations A-S-P-F-I
Operations A-R-P-F-I
Operations A-S-E-P-I
Operations A-S-E-P-F-I
Operations A-E-PV-P-I
Operations A-E-PV-P-F-I
Operations A-S-E-PV-P-I
Operations A-S-E-PV-P-F-I
Operations A-E-PV-R-P-I
Operations A-E-PV-R-P-F-I
Operations A-S-E-PV-R-P-I
Operations A-S-E-PV-R-P-F-I, for the most complete treatment.

To illustrate the invention, non-limiting examples will be given below of several composite compounds which can be realized on the basis of materials and techniques of the prior art, along with examples of processes which make it possible to obtain them.

For the compounds, the type and shape of the reinforcement will be indicated, the type of the adherization layer and, if any, the type of additional coating layer by an elastomer compound, it being understood that in all cases, the adherized reinforcement is coated with a thin layer of high-molecular-weight polyolefin and is included in a polyolefin matrix, the nature of these polyolefins being indicated without additional details.

The compound C1 is one example of a continuous reinforcement composite:

the reinforcement comprises an artificial fiber, rayon, used in the form of threads;

the adherization layer is realized from a ternary resorcinol, formol and SBR latex compound, a conventional compound in the adherization techniques used in the rubber transformation industry:

the polyolefin with a high molecular weight is polyethylene;

the polyolefin of the matrix is polypropylene.

Process P1 is the set of treatments applied to the reinforcement based on rayon threads to obtain a composite according to Compound C1.

It is defined by the execution, in the sequence indicated, of the following operations:

adherization of the rayon threads by continuous passage through an aqueous dispersion of the adherization compound, heat treatment causing the partial polycondensation of the adherization compound;

absence of roughening;

coating by passage in a solution of high-molecular-weight polyethylene (GUR Hostalene, made by Hoechst of West Germany), at a concentration of 5% in decaline, at approximately 140 degrees C.;

deposit of a polypropylene film on a shaping form;

filamentary winding on the shaping form of the adherized reinforcement;

deposit of a new polypropylene film:

heat treatment at 150 degrees C., to make the surface tacky, to ensure cohesion of the constituent elements.

Compound C2 is another preferred example of a continuous reinforcement composite:

the reinforcement comprises an artificial fiber, rayon, used in the form of fabric;

the adherization layer is realized from a ternary resorcinol, formol and vinylpyridine latex compound;

a thin layer of SBR-base elastomer compound is applied to the adherization compound;

the high-molecular-weight polyolefin is polyethylene;

the polyolefin of the matrix is linear, low density polyethylene, with a melt index of 5.

Process P2 is the set of treatments applied to the rayon fabric to obtain a composite in accordance with Compound C2.

It is preferably defined by the execution, in the sequence indicated, of the following operations:

adherization of the rayon fabric by passage through an aqueous dispersion of the adherization compound;

deposit of a film of high-molecular-weight polyethylene 0.05 millimeters thick on a shaping mandrel;

deposit, on the mandrel, above the high-molecular-weight polyethylene film, of a sheet of SBR-base elastomer compound:

roughening;

winding of the adherized fabric on the mandrel, above the elastomer compound sheet:

deposit, on the adherized fabric, of a sheet of SBR-base elastomer compound;

roughening:

deposit of a new high-molecular-weight polyethylene film;

heat treatment intended to ensure the cohesion of the constituent elements;

separation of the assembly from the mandrel;

deposit, on both sides, of a film of linear, low-density polyethylene, with a melt index of 5, to constitute the matrix.

Compound C3 is a preferred example of a continuous reinforcement composite. The reinforcement comprises:

a synthetic, polyester-base fiber, used in the form of threads;

the adherization layer is realized from a ternary resorcinol, formol and vinyl pyridine latex compound;

the high-molecular-weight polyolefin is polypropylene;

the polyolefin of the matrix is polypropylene.

Process P3 is the set of treatments applied to the polyester-base reinforcement to obtain a composite in accordance with Compound C3.

It is preferably defined by the execution, in the sequence indicated, of the following operations:

adherization of the polyester, by passage through an aqueous dispersion of the adherization compound;

heat treatment causing the partial polycondensation of the adherization compound;

roughening;

coating by passage in a fluidized bed of high-molecular-weight polypropylene;

extrusion of a polypropylene sheath on the reinforcement.

Compound C4 is a preferred example of a continuous reinforcement composite:

the reinforcement comprises a high-modulus synthetic fiber, an aromatic—or aramid—polyamide (Kevlar 29, made by Dupont de Nemours), used in the form of fabric;

the adherization layer is realized from a ternary resorcinol, formol and vinyl pyridine latex compound;

an additional coating layer consists of an elastomer compound pound on an ethylene and propylene terpolymer base, called EPDM rubber;

the high-molecular-weight polyolefin is polyethylene;

the polyolefin of the matrix is high-density polyethylene, with a melt index equal to 3.

Process P4 is the set of treatments applied to the aramid-based reinforcement to obtain a composite in accordance with Compound C4.

It is preferably defined by the execution, in the sequence indicated, of the following operations:

adherization of the reinforcement, by passage in an aqueous dispersion of the adherization compound:

heat treatment causing the partial polycondensation of the adherization compound:

absence of roughening;

deposit of an additional coating layer comprising an EPDM rubber-base elastomer compound, by some other type of surface coating process including possible immersion or continuous coating thereof;

pre-vulcanization heat treatment designed to improve the adherence between the adherization layer and the coating with the elastomer compound;

roughening;

coating by passage in a high-molecular-weight polyethylene solution (GUR Hostalene, made by Hoechst of West Germany), at a concentration of 5% in decaline, at approximately 140 degrees C.;

incorporation in the matrix by deposit of a sheet of polyethylene above and below the adherized reinforcement coated with polyolefin and elastomer;

heat treatment at a temperature of 145 degrees C., to ensure the cohesion of the constituent elements.

Compound C5 is a preferred example of a continuous reinforcement composite:

the reinforcement comprises a synthetic fiber, a polyamide 6-6, used in the form of threads;

the adherization layer is realized from an elastomer compound, on a natural rubber base, of a suitable formulation, i.e. including adherence promoters, according to a technique of the prior art, the so-called HRH formulation;

the high-molecular-weight polyolefin is polyethylene;

the polyolefin of the matrix is linear, low density polyethylene, with a melt index of 5.

Process P5 is the set of treatments applied to the polyamide-base reinforcement to obtain a composite in accordance with Compound C5.

It is preferably defined by the execution, in the indicated sequence, of the following operations:

adherization of the reinforcement, by passage through a solution of the elastomer adherization compound;

pre-vulcanization heat treatment designed to improve the adherence between the adherization layer and the coating by the elastomer compound;

coating by extrusion of a sheath of a low thickness of high-molecular-weight polyethylene (GUR Hostalene, made by Hoechst of West Germany):

incorporation in the matrix by extrusion of a polyethylene sheath.

Compound C6 is a preferred example of a continuous reinforcement composite:

The reinforcement comprises a mineral fiber, glass fiber, used in the form of fabric;

the adherization layer is realized by the fiber supplier, for adherence to rubber;

a layer of EPDM-rubber-base elastomer compound is added;

the high-molecular-weight polyolefin is polyethylene:

the polyolefin of the matrix is low density polyethylene with a melt index equal to 6.

Process P6 is the set of treatments applied to the glass fabric base reinforcement to obtain a composite in accordance with Compound C6.

It is preferably defined by the execution, in the indicated sequence, of the following operations:

deposit of a coating layer comprising an EPDM rubber base elastomer compound by some other type of surface coating including possible immersion or continuous coating thereof;

pre-vulcanizing heat treatment intended to improve the adherence between the adherization layer and the coating by the elastomer compound;

coating by passage in a high-molecular weight polyethylene solution (GUR Hostalene, made by Hoechst of West Germany), at a concentration of 5% in decaline, at 140 degrees C.;

incorporation in the polyethylene matrix by calendaring of the adherized reinforcement coated with elastomer and polyolefin.

Compound C7 is a preferred example of a continuous reinforcement composite:

the reinforcement comprises thin metal cables, made of steel, covered with a thin layer of brass, such as those fabricated by Bekaert, and used in the form of cables;

the adherization layer is realized from a solution of elastomer compound with an appropriate formulation, i.e. according to a technique of the prior art, comprising cobalt salts which act as adhesion promoters:

the high-molecular-weight polyolefin is polyethylene;

the polyolefin of the matrix is high-density polyethylene, with a melt index of 0.5.

Process P7 is the set of treatments applied to the reinforcement based on brass-coated metal cables, to obtain a composite in accordance with Compound C7.

It is preferably defined by the execution, in the sequence indicated, of the following operations:

adherization of the reinforcement material, by passage in a solution of the adherization compound;

heat treatment causing the partial vulcanization of the adherization compound;

roughening;

coating by passage in a fluidized bed of high-molecular-coating weight polyethylene (GUR Hostalene, made by Hoechst of West Germany):

heat treatment intended to ensure the cohesion of the components:

incorporation in the matrix by extrusion of a polyethylene sheath around the adherized cable coated with high-molecular-weight polyolefin.

Compound C8 is a preferred example of a continuous reinforcement composite:

the reinforcement comprises thin steel metal cables, covered with a thin layer of brass, fabricated by Bekaert and used in the form of fabric:

the adherization layer is realized from a solution of elastomer compound of an appropriate formulation, i.e. according to a technique of the prior art, comprising cobalt salts acting as adhesion promotors;

the high-molecular-weight polyolefin is polypropylene;

the polyolefin of the matrix is polypropylene.

Process P8 is the set of treatments applied to the reinforcement based on brass-plated metal cable fabric to obtain a composite in accordance with Compound C8.

It is preferably defined by the execution, in the order indicated, of the following operations:

adherization of the reinforcement, by some other type of surface coating including possible immersion or continuous coating thereof into the adherization compound;

heat treatment causing the partial vulcanization of the adherization compound;

roughening;

coating by fluidization, in a suspension in nitrogen, of high-molecular-weight polypropylene;

heat treatment designed to ensure the cohesion of the components;

incorporation in the matrix by calendering, in the form of a sandwich of the adherized reinforcement between two polypropylene plates;

heat treatment at a temperature of 155 degrees C., to ensure the cohesion of the constituent elements.

Compound C9 is a preferred example of a discontinuous reinforcement composite:

the reinforcement comprises a short artificial fiber, spun rayon;

the adherization layer is realized from a ternary resorcinol, formol and SBR latex compound;

the high-molecular-weight polyolefin is polypropylene;

the polyolefin of the matrix is polypropylene.

Process P9 is the set of treatments applied to the spun rayon-base reinforcement to obtain a composite in accordance with Compound C9.

It is preferably defined by the execution, in the sequence indicated, of the following operations:

adherization of the reinforcement, by impregnation, under agitation, in an aqueous solution of the adherization compound;

coating by treatment in a solution of high-molecular-weight polypropylene;

incorporation in the matrix in a cylinder mixer, which creates a composite exhibiting anisotropy on account of the orientation of the fibers, longitudinally, during the calendering operation.

Compound C10 is a preferred example of a discontinuous reinforcement composite:

the reinforcement comprises a synthetic fiber, polyester, used in the form of short fibers;

the adherization layer is realized from a ternary resorcinol, formol and SBR latex compound:

the high-molecular-weight polyolefin is polyethylene;

the polyolefin of the matrix is high-density polyethylene, with a melt index of 8.

Process P10 is the set of treatments applied to the short polyester fiber base reinforcement to obtain a composite in accordance with Compound C10.

It is preferably defined by the execution, in the sequence indicated, of the following operations:

adherization of the reinforcement, by passage in an aqueous dispersion of the adherization compound;

heat treatment causing the partial polycondensation of the adherization compound;

absence of roughening:

deposit of an additional coating layer, comprising an SBR rubber base elastomer compound, in a cylinder mixer, and cutting of the elastomer-covered adherized coating into strips;

coating by passage in a solution of high-molecular-weight polyethylene (GUR Hostalene, made by Hoechst of West Germany), in decaline;

cutting of the fiber into elements the length of which is no more than several tens of millimeters long:

incorporation in the matrix by mixing in an internal mixer of the adherized coating coated with elastomer and polyolefin and high-density polyethylene, with a melt index of 8:

heat treatment at a temperature of 135 degrees C., to ensure the cohesion of the constituent elements.

Compound C11 is a preferred example of a discontinuous reinforcement composite:

the reinforcement comprises a synthetic, high-modulus fiber, aromatic polyamide, or aramid (Twaron, made by ENKA of West Germany);

the adherization layer is realized from an epoxy resin compound and 15% dry weight vinyl pyridine latex:

the additional coating layer comprises an EPDM rubber base elastomer compound:

the high-molecular-weight polyolefin is polyethylene;

the polyolefin of the matrix is linear, low-density polyethylene, with a melt index of 5.

Process P11 is the set of treatments applied to the aramid short fiber base reinforcement to obtain a composite in accordance with Compound C11.

It is preferably defined by the execution, in the sequence indicated, of the following operations:

adherization of the reinforcement, by passage through an aqueous dispersion of the adherization compound;

deposit of an additional coating layer comprising an EPDM rubber base elastomer compound by extrusion of said elastomer compound on the fiber, before the fiber has been cut;

coating by passage in a solution of high-molecular-weight polyethylene (GUR Hostalene, made by Hoechst of West Germany) at a concentration of 5% in decaline, at approximately 140 degrees C.;

cutting the fiber into elements the length of which is no more than several tens of millimeters in length:

incorporation in the matrix by mixing in a cylinder mixer, which produces an anisotropic composite.

Compound C12 is another preferred example of a discontinuous reinforcement composite:

the reinforcement comprises a mineral fiber, glass fiber, used in the form of short fibers:

the adherization layer is realized from a ternary resorcinol, formol and vinyl pyridine latex compound;

the high-molecular-weight polyolefin is polyethylene:

the polyolefin of the matrix is a linear, high-density polyethylene, with a melt index of 5.

Process P12 is the set of treatments applied to the short glass fiber base reinforcement to obtain a composite in accordance with Compound C12.

It is preferably defined by the execution, in the sequence indicated, of the following operations:

adherization of the reinforcement, by impregnation of the fiber in an aqueous dispersion of the adherization compound;

coating by passage in a high-molecular-weight polyethylene solution (GUR Hostalene, made by Hoechst of West Germany), at a concentration of 5% in decaline, at 140 degrees C.:

cutting into short fibers 5 millimeters in length;

incorporation in the matrix, which is in the form of powder;

extrusion of the composite material and granulation for subsequent transformations for the realization of finished products.

Adherence tests were conducted on the different compounds C1 to C12 defined above, to measure bonding strength of the reinforcement to the matrix, either in the form of cylinders of composite molded around a reinforcement consisting of threads or cables, or in the form of a so-called "trousers" test piece for fabric reinforcements, in which case the separation between the fabric and the matrix is tested. For discontinuous reinforcement composites, it is the separation force which is measured.

These measurements of adhesion or separation force were conducted on the composites which are the object of the invention, in relation to reference specimens, of the same composition, with the exception of the coating with high-molecular-weight polyolefin.

As predicted, no adhesion value could be measured on the compounds reinforced with threads or cables of compounds C1, C3, C5 and C7, where the value measured was that of the failure of the matrix. On the corresponding reference specimens, the value of the adhesion between the reinforcement and the matrix was only a few MPa, corresponding to the participation of the modulus of the matrix to the tensile force exerted on the reinforcement.

The same applied for the compounds including a continuous reinforcement, in the form of fabric, such as C2, C4, C6 and C8. The values measured represent the tearing or the rupture of the polyolefin matrix; it was not possible to determine the adhesive bond between the matrix and the reinforcement.

With regard to the discontinuous reinforcement compounds, the separation force measured was in all cases greater than 12 MPa for Compounds C9 to C12, while it was very much less than 1 MPa for the reference specimens, realized without high-molecular-weight polyolefin coating of the adherized coating.

These results show that, by means of the high-molecular-weight polyolefin coating, it is possible to create an intimate bond between a reinforcement coated by an adherization compound comprising an elastomer and a high-molecular-weight polyolefin matrix, thanks to the interposition between said adherized reinforcement and the polyolefin matrix of a thin layer of a high-molecular-weight polyolefin.

The invention therefore makes it possible to realize economic matrix composites thanks to the use of cheap polyolefin materials, which would not usually otherwise be possible without chemical modification of the polyolefin. These composites are also easy to use in conventional techniques in the polymer transformation industry. They have excellent mechanical properties thanks to the presence of the reinforcement, and in particular, a creep under load which is very limited, on account of the intimate bond between the reinforcement and the matrix.

A specialist skilled in the art can, of course, make various modifications to the composite material and/or to the process for its realization, as well as to their variants described and illustrated herein by way of non-limiting examples—in particular in the type of fibers and in the adherization, and coating treatments, and in the incorporation of the polyolefin-coated adherized reinforcement in the matrix—without thereby going beyond the context of the invention.

In summing up, some of the examples of the processes outlined in FIG. 4 are:

Compounds C1, C2 and C9 are examples of continuous reinforcement composites for compounds C1 and C2 and discontinuous reinforcement composites for compound C9, these reinforcement comprising an artificial fiber, rayon or spun rayon:

Processes P1, P2 and P9 are, by way of non-limiting examples, the set of treatments applied to the rayon-based or spun rayon-based reinforcement to obtain composites in accordance with compounds C1, C2, C9;

Compounds C3, C5 and C10 are examples of continuous reinforcement composites for compounds C3 and C5, and discontinuous reinforcement composites for Compound C10, said reinforcement comprising synthetic fibers, polyamide and polyester;

Processes P3, P5 and P10 are, by way of non-limiting examples, the set of treatments applied to the polyamide-based or polyester-based reinforcement to obtain composites in accordance with Compounds C3, C5 and C10:

Compounds C4 and C11 are examples of continuous reinforcement composites for Compound C4 and discontinuous for Compound C11, said reinforcement comprising a synthetic fiber with a high modulus, aramid;

Processes P4 and P11 are, by way of non-limiting examples, the set of treatments applied to the aramid-base reinforcement to obtain composites in accordance with Compounds C4 and C11;

Compounds C6 and C12 are examples of continuous reinforcement composites for Compound C6 and discontinuous for compound C12, said reinforcement being constituted of a mineral fiber, glass;

Processes P6 and P12 are, by way of non-limiting examples, the set of treatments applied to the glass fiber base reinforcement to obtain composites in accordance with Compounds C6 and C12;

Compounds C7 and C8 are examples of continuous reinforcement composites consisting of brass-plated steel cable;

Processes P7 and P8 are, by way of non-limiting examples, the set of treatments applied to the brass-plated steel cable based reinforcement to obtain composites in accordance with Compounds C7 and C8.

Some examples of pultrusion are U.S. Pat. No. 4,445,957 entitled "Method and Means for Making Constant Cross Sectional Area Pultruded Fiber Reinforced Polymeric Articles" and U.S. Pat. No. 4,680,224 entitled "Reinforced Plastic." These patents are incorporated by reference as if included in their entirety herein.

The invention as described hereinabove in the context of a preferred embodiment is not to be taken as limited to all of the provided details thereof, since modifications and variations thereof may be made without departing from the spirit and scope of the invention.

What is claimed is:

1. A composite material comprising:
    a matrix comprising polyolefin material, and
    reinforcement means disposed at least partially in said polyolefin material,
    said reinforcement means having a coating of at least one layer for providing adhesion between said polyolefin material and said reinforcement means.

2. A composite material according to claim 1, wherein said polyolefin material comprises at least one of a high-density polyethylene, a low-density polyethylene, a linear polyethylene, a branched polyethylene, polypropylene, a higher homologue of polyolefin and one of the semi-crystalline copolymers of a high-density polyethylene, a low-density polyethylene, a linear polyethylene, a branched polyethylene, polypropylene and a higher homologue of polyolefin.

3. A composite material according to claim 1, wherein said reinforcement means comprises material in continuous form and said material in continuous form comprises at least one of a natural material, an artificial material, a synthetic material, a textile material and a metal material in continuous form.

4. A composite material according to claim 3, wherein said material in continuous form comprises at least one of threads, cables, yarn, knitted fabric, and woven fabric.

5. A composite material according to claim 1, wherein said reinforcement means comprises material in discontinuous form and said material in discontinuous form comprises at least one of short fibers, felt and non-woven material.

6. A composite material according to claim 1, wherein said layer for providing adhesion between said polyolefin material and said reinforcement means comprises at least one elastomer component.

7. A composite material according to claim 1, wherein the coating provides an intimate bond between the polyolefin material and the reinforcement means, said coating being substantially thinner than the thickness of the reinforcement means.

8. A composite material according to claim 1, wherein said polyolefin material comprises at least one of polyethylene and polypropylene of an average molecular weight of at least 500,000.

9. A composite material according to claim 1, wherein said layer for providing the adhesion comprises thermosetting resin.

10. A composite material according to claim 9, wherein said thermosetting resin comprises at least one of:
    an epoxy, a formo-phenol compound and a resorcinol-formol condensate, said thermosetting resin being associated with an elastomer latex.

11. A composite material according to claim 9, wherein said thermosetting resin comprises at least one of:
    an epoxy, a formo-phenol compound, and a resorcinol-formol condensate, said layer for providing the adhesion comprising additionally an elastomer compound coating, said elastomer compound coating being substantially thinner than the thickness of the reinforcement means.

12. A composite material according to claim 1, including a polyolefin, for the coating of the reinforcement means to produce the layer for providing the adhesion thereon, comprises polyethylene with an average molecular weight of at least 500,000; the matrix comprising at least one of:
    (a) polyethylene,
    (b) polypropylene,
    (c) one of the higher homologues of polyolefins and
    (d) one of the semi-crystalline copolymers of:
    polyethylene, polypropylene and one of the higher homologues of polyolefins.

13. A composite material according to claim 1, including a polyolefin, for the coating of the reinforcement means to produce the layer for providing the adhesion thereon, comprises polypropylene with an average molecular weight of at least 500,000; the matrix comprising at least one of:
    (a) polyethylene,
    (b) polypropylene,
    (c) one of the higher homologues of polyolefins and
    (d) one of the semi-crystalline copolymers of:
    polyethylene, polypropylene and one of the higher homologues of polyolefins.

14. A composite material according to claim 1, wherein the reinforcement means comprises at least one of a continuous and discontinuous synthetic fibers.

15. A composite material according to claim 14, wherein said synthetic fibers comprise at least one of a polyamide, an aromatic polyamide, a polyester, a polyvinyl alcohol, a polyacrylonitrile and a carbon fiber.

16. A composite material according to claim 1, characterized by the fact that the reinforcement means comprises at least one of a continuous artificial fiber material and a discontinuous artificial fiber material.

17. A composite material according to claim 16, wherein said continuous artificial fibers comprises rayon and said discontinuous artificial fibers comprise spun rayon.

18. A composite material according to claim 1, wherein the reinforcement means comprises at least one of continuous and discontinuous glass fibers.

19. A composite material according to claim 1, wherein the reinforcement means comprises at least one of continuous and discontinuous brass-plated steel wires.

20. A composite material according to claim 1, wherein the reinforcement means comprises at least one of continuous natural fibers and discontinuous natural fibers.

21. A composite material according to claim 20, wherein said continuous natural fibers comprise silk and said discontinuous natural fibers comprise cotton.

22. A process for making a composite material having a polyolefin matrix and a reinforcement material in said matrix, said process comprising the steps of:
    coating said reinforcement material with an adhesive layer, and
    disposing said reinforcement material with said coating at least partially in said polyolefin matrix, said coating for providing intimate adhesion between said polyolefin matrix and said reinforcement material.

23. The process for producing a composite material according to claim 22, wherein said coating comprises applying an adherization compound comprising at least one elastomer component to the reinforcement material, further including the step of coating said adherizationcompound with a polyolefin by passing said adherization compound in a solution of said high-molecular-weight polyolefin in decaline.

24. The process for producing a composite material according to claim 23, wherein said polyolefin comprises one of polyethylene or polypropylene with an average molecular weight of at least 500,000.

25. The process for producing a composite material according to claim 22, wherein said coating comprises applying an adherization compound comprising at least one elastomer component to the reinforcement material, further including the step of coating said adherization compound with a polyolefin by passing said adherization compound in a fluidized bed comprising a suspension of particles of said high-molecular-weight polyolefin in a gaseous flux such as air or nitrogen.

26. The process for producing a composite material according to claim 25, wherein said polyolefin comprises one of polyethylene or polypropylene with an average molecular weight of at least 500,000.

* * * * *